United States Patent [19]

Someya et al.

[11] Patent Number: 5,659,788

[45] Date of Patent: Aug. 19, 1997

[54] MANAGEMENT SYSTEM COMPRISING A UNIFIED INTERFACE FOR INTEGRATING A PLURALITY OF DIFFERENT SYSTEM MANAGEMENT SOFTWARE TOOLS

[75] Inventors: Harushi Someya, Kawasaki; Kazuyuki Ikeda, Yokohama; Tsutomu Tashiro, Fujisawa; Takatoshi Shimizu, Machida, all of Japan

[73] Assignee: Hitachi, Ltd., Tokyo, Japan

[21] Appl. No.: 559,727

[22] Filed: Nov. 15, 1995

Related U.S. Application Data

[63] Continuation of Ser. No. 226,953, Apr. 13, 1994, abandoned.

[30] Foreign Application Priority Data

Apr. 19, 1993 [JP] Japan .................................. 5-091060

[51] Int. Cl.$^6$ .................................................. G06F 9/455
[52] U.S. Cl. ................................................ 395/500; 395/340
[58] Field of Search .................................. 395/500, 401, 395/375, 159, 163

[56] References Cited

U.S. PATENT DOCUMENTS

| | | | |
|---|---|---|---|
| 4,751,635 | 6/1988 | Kret | 364/200 |
| 4,831,556 | 5/1989 | Oono | 364/521 |
| 4,862,389 | 8/1989 | Takagi | 364/521 |
| 4,903,218 | 2/1990 | Longo et al. | 364/521 |
| 4,937,036 | 6/1990 | Beard et al. | 395/500 |
| 4,939,507 | 7/1990 | Beard et al. | 395/500 |
| 4,965,743 | 10/1990 | Malin et al. | 364/513 |
| 5,051,930 | 9/1991 | Kuwabara et al. | 364/523 |
| 5,062,060 | 10/1991 | Kolnick | 364/521 |
| 5,228,137 | 7/1993 | Kleinerman et al. | 395/500 |
| 5,241,625 | 8/1993 | Epard et al. | 395/163 |
| 5,261,044 | 11/1993 | Dev et al. | 395/159 |
| 5,305,435 | 4/1994 | Bronson | 395/159 |
| 5,315,711 | 5/1994 | Barone et al. | 395/275 |
| 5,327,558 | 7/1994 | Burke et al. | 395/650 |
| 5,329,619 | 7/1994 | Page et al. | 395/200 |
| 5,420,582 | 5/1995 | Kubbat et al. | 340/974 |
| 5,436,909 | 7/1995 | Dev et al. | 371/20.1 |
| 5,438,661 | 8/1995 | Ogawa | 395/157 |
| 5,504,921 | 4/1996 | Dev et al. | 395/800 |

OTHER PUBLICATIONS

Katori, et al. "Operation and Control of Systems," published by Ohm–Sha, Jan. 1992, pp. 27–31. (Japanese).

*Primary Examiner*—Parshotam S. Lall
*Assistant Examiner*—Zarni Maung

[57] ABSTRACT

A computer having a terminal unit corresponding to a multiwindow is coupled with a control object system to be operated through communication devices. Furthermore, there are provided in the computer an emulation unit for emulating the operation of a terminal unit operated by respective operating tools software-wise, a unit for aggregating and processing message groups outputted by respective operating tools, a unit for controlling display of aggregated and processed information in a multiwindow, a unit for interpreting and converting the operation from a terminal unit corresponding to a multiwindow into a command group of respective operating tools and a unit for generating a picture interface of a terminal unit corresponding to a multiwindow by interlocking with an existing Office automation (OA) tool, thereby to unify and aggregate functions of a plurality of operating tool groups in one window.

7 Claims, 11 Drawing Sheets

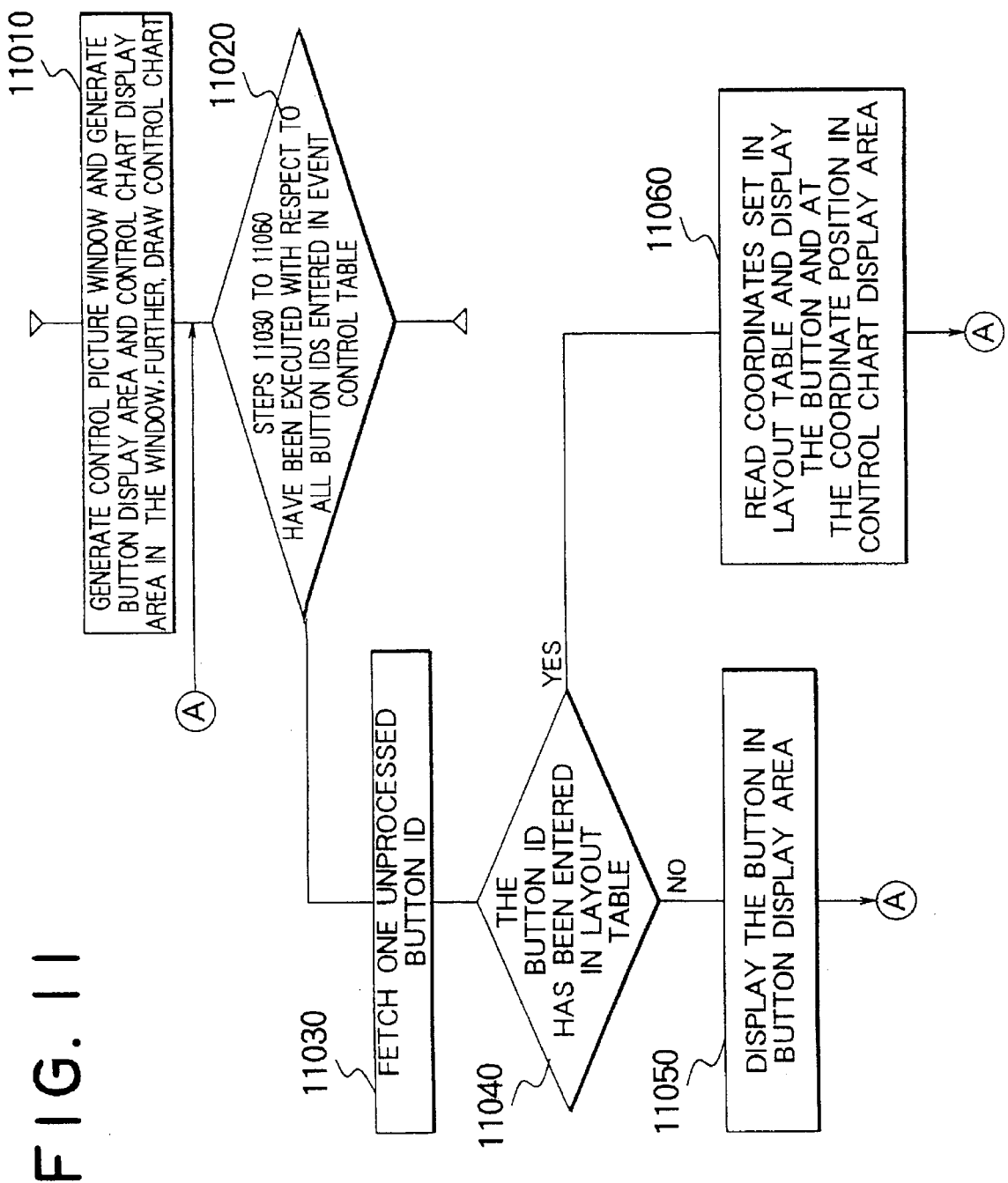

MANAGEMENT SYSTEM COMPRISING A UNIFIED INTERFACE FOR INTEGRATING A PLURALITY OF DIFFERENT SYSTEM MANAGEMENT SOFTWARE TOOLS

This is a continuation of application Ser. No. 08/226,953, filed Apr. 13, 1994, now abandoned.

BACKGROUND OF THE INVENTION

The present invention relates to a method of operating a computer system and a support system thereof, and more particularly to a support system for having existing operating tool groups function by a unified interface so as to unify the operations of the system of the system at a site where operations of a computer system formed of a plurality of subsystems are performed using a plurality of operating tool groups for which operation methods are different.

Operation support tools of a computer system include an automation tool for routine system operation such as start and stop of the system, an automatic execution tool of a business program, and further a service monitoring tool for system resources. Concerning these tools, for example, "Operation and Control of Systems" under Joint authorship with Katori et al. published by Ohm-Sha, January 1992, pp. 27–31 can be referred to. The automation tool for system operation is so devised that operation commands for a system control program such as an operating system and a Data Base/Data Communication System (DB/DC system) are issued automatically in accordance with a start/stop schedule of a system, an execution schedule of a business program, and service conditions of computer resources. Thus, being greatly dependent on hardware of a computer and a system control program such as an operating system, an automatic operating tool is provided for each computer or operating system.

Since the work monitoring tool is also required to have a monitoring function dependent on a system control program such as hardware and an operating system, the provided work monitoring tool is an exclusive tool limited to certain hardware or a certain operating system. The operation methods for these exclusive operating tool groups are different for each tool.

Formation of an operating tool into multivendor is being put forward recently by expanding the scope of support objects of hardware and operating systems. Further, a tool group for displaying work data of the system visually by adopting a graphical user interface has been proposed.

SUMMARY OF THE INVENTION

Since the operating tool in the article described above is an exclusive tool dependent on hardware of a computer and a system control program such as an operating system, it is required to operate a plurality of operating tools in application in an information processing system such as a financial information system structured by integrating a plurality of computer resources such as host computers, work stations, Wide area networks and local area networks. Since the operation methods are different for every operating tool under the existing circumstances, the load of operations imposed on an operator is large.

Further, every time when a new subsystem is introduced into an existing system, an exclusive operating tool is introduced, and an operator has to learn the function and the manipulating method of the operating tool in accordance therewith. In particular, in an information processing system site which forms a multivendor system, the load imposed on the operator is larger, and an advanced operating skill is required for the operator.

Thus, it is aimed at to form an operating tool in a multivendor so as to unify the operations of the tool system. However, this approach is to go into the details of the hardware of different vendors and a system control program such as an operating system so as to expand the exclusive defensive range of the exclusive tool, which basically falls under the category of the conventional technique. Therefore, this approach does not solve the above-mentioned problems thoroughly.

Further, the scale of the software of a tool corresponding to a multivendor developed by this approach becomes very extensive and maintenance of extensive software becomes necessary at every version-up of the operating system. Thus, maintenance and control of the operating tool itself becomes more difficult. Furthermore, this approach for unification leads to disclosure of detailed specifications of the hardware and the operating system of its own company to other companies in the same line of business. Thus, disclosure of detailed specifications can not be expected from the viewpoint of business secret. Accordingly, even if it were multivendor correspondence, the tool is quite within the bounds of possibility to be a tool which is insufficient functionwise.

The above-mentioned problem exists in that, notwithstanding that an exclusive tool is already in existence, other vendors are going to develop a tool equivalent to that exclusive tool. The present invention is to aim at unification of operations based on an idea different therefrom. The idea of the present invention is such that, from a position that a vendor who has developed hardware or software knows information required for development of an exclusive tool the best, the exclusive tool of its own company provided by a manufacturer is to be utilized positively. It is an object of the present invention to realize unified operation of a system by having existing operating tool groups especially designed for specific associated systems and for which operation methods are different, function together by means of a unified interface.

BRIEF DESCRIPTION OF THE DRAWINGS

FIG. 11 is a diagram showing a part of the processing flow of the message handling control portion forming the operating tool group handling portion in FIG. 9.

DESCRIPTION OF THE PREFERRED EMBODIMENTS

Figure 1:
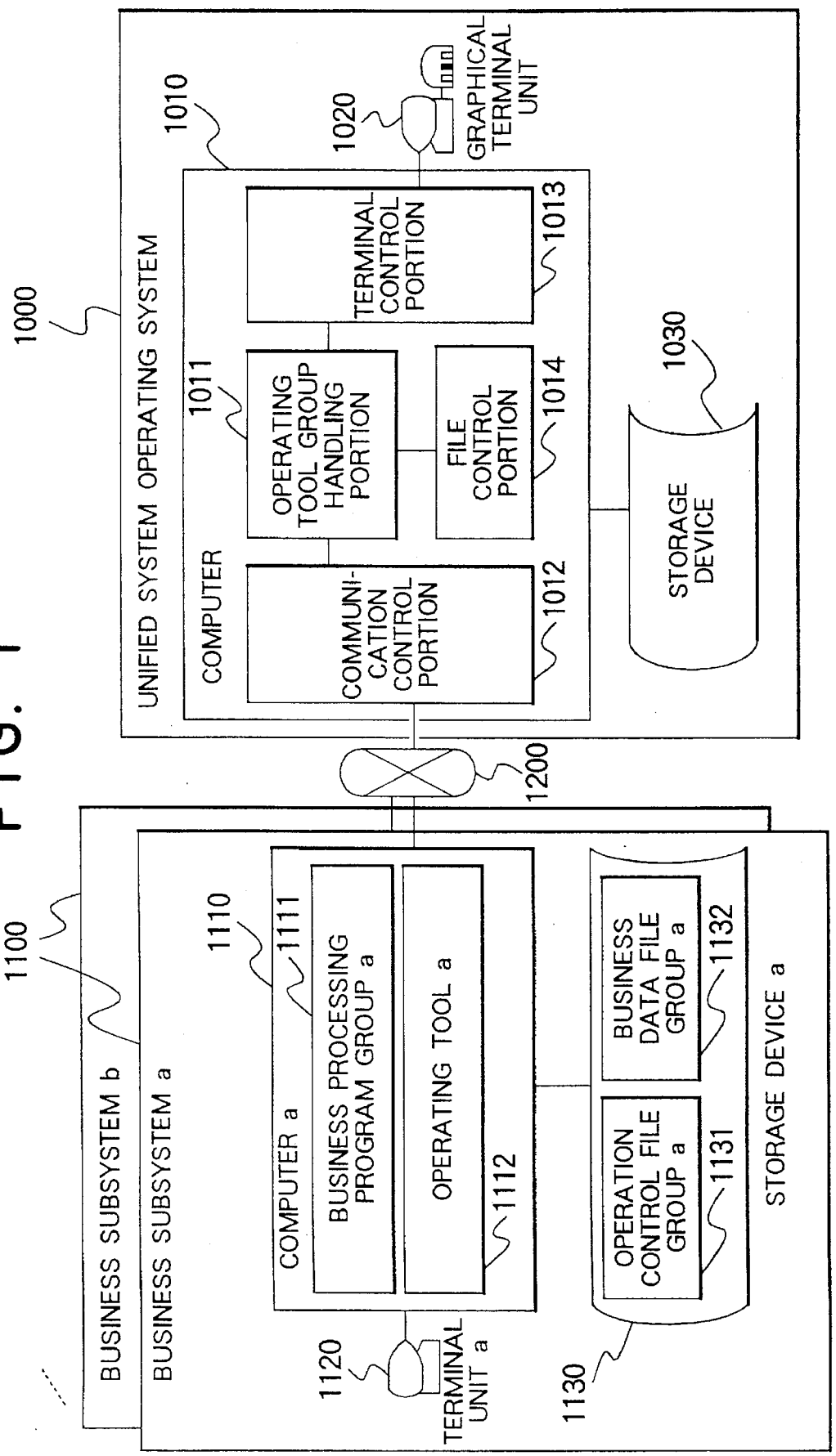
FIG. 1 is a diagram showing a general system structure surrounding a unified system operating system which is the present invention.

According to the present invention, a computer having a terminal unit corresponding to a multiwindow is provided, and this computer and a system which is the object of operation are concatenated by communication means. Furthermore, there are provided in the computer having a terminal unit corresponding to a multiwindow, an emulation means for emulating the operation of the terminal unit operated by respective operating tools software-wise, means for aggregating and working message groups outputted by respective operating tools, means for controlling display of aggregated and worked information in a multiwindow, means for interpreting and converting the operation from a terminal unit corresponding to a multiwindow into command groups of respective operating tools, and means for generating a picture interface of the terminal unit corresponding to a multiwindow by cooperating with an existing Office Automation (OA) tool.

The functions of a plurality of operating tool groups are unified and aggregated at one window (a computer having a terminal unit corresponding to a multiwindow) by these means, thereby to make it possible to perform display of message groups such as a system working state and a business processing program execution state transmitted from respective operating tool groups and command inquiry to respective operating tool groups from one terminal unit. Further, it is made possible to operate operating tool groups for which operation methods are different by means of the same operating interface so that respective various message groups may be aggregated and worked so as to be displayed visually, and furthermore, the operating tool groups for which operation methods are different may be operated by the same operation interface.

According to the present invention, a message exchange interface with a plurality of operating tools can be established by the terminal emulation means, and it becomes possible to fetch message groups of a plurality of operating tools into one terminal unit and to issue commands of respective operating tool groups from one terminal unit. In the display of collected message groups, related message groups among the collected message groups are aggregated without distinction of operating tools which are the sources thereof and processed and displayed visually in a specific window by the means for aggregating and processing message groups and means for controlling multiwindow display. In the issuance of commands to respective operating tool groups, respective commands are issued to the operating tool groups for which operation methods are different by the same operation by the means for interpreting and converting the operation from the terminal unit corresponding to the multiwindow into command groups of respective operating tools. Further, a plurality of command groups are issued in one operation from the terminal unit corresponding to the multiwindow. Thus, it is possible to unify and aggregate the functions of a plurality of operating tool groups in one window (a computer having a terminal unit corresponding to a multiwindow), thus making aggregation and processing of information of various message groups from respective operating tool groups and visual display of the processed information thereof possible.

Further, it is possible to operate the operating tool groups for which operation methods are different by means of the same operation interface. As a result, it is possible to unify visual grasp of the working state of the total system and system operation by easy operation in one terminal unit.

Furthermore, a user, i.e., an operator can perform unified operation of a system by a picture interface easy to control by generating a picture on a terminal unit by means of an OA tool it is accustomed to use normally.

Figure 2:
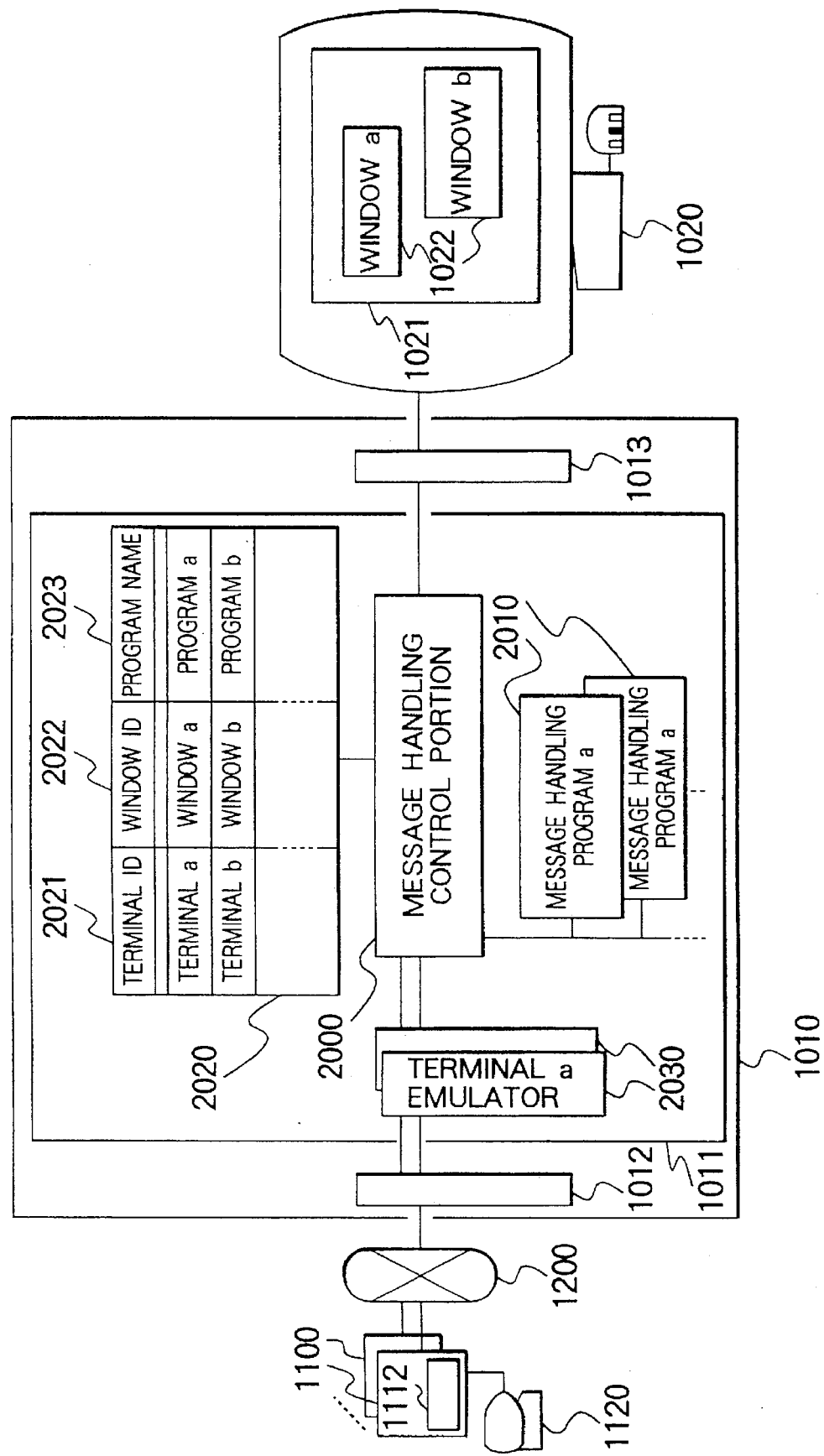
FIG. 2 is a diagram showing a structure of a first embodiment of an operating tool group handling portion forming the unified system operating system in FIG. 1.
Figure 3:
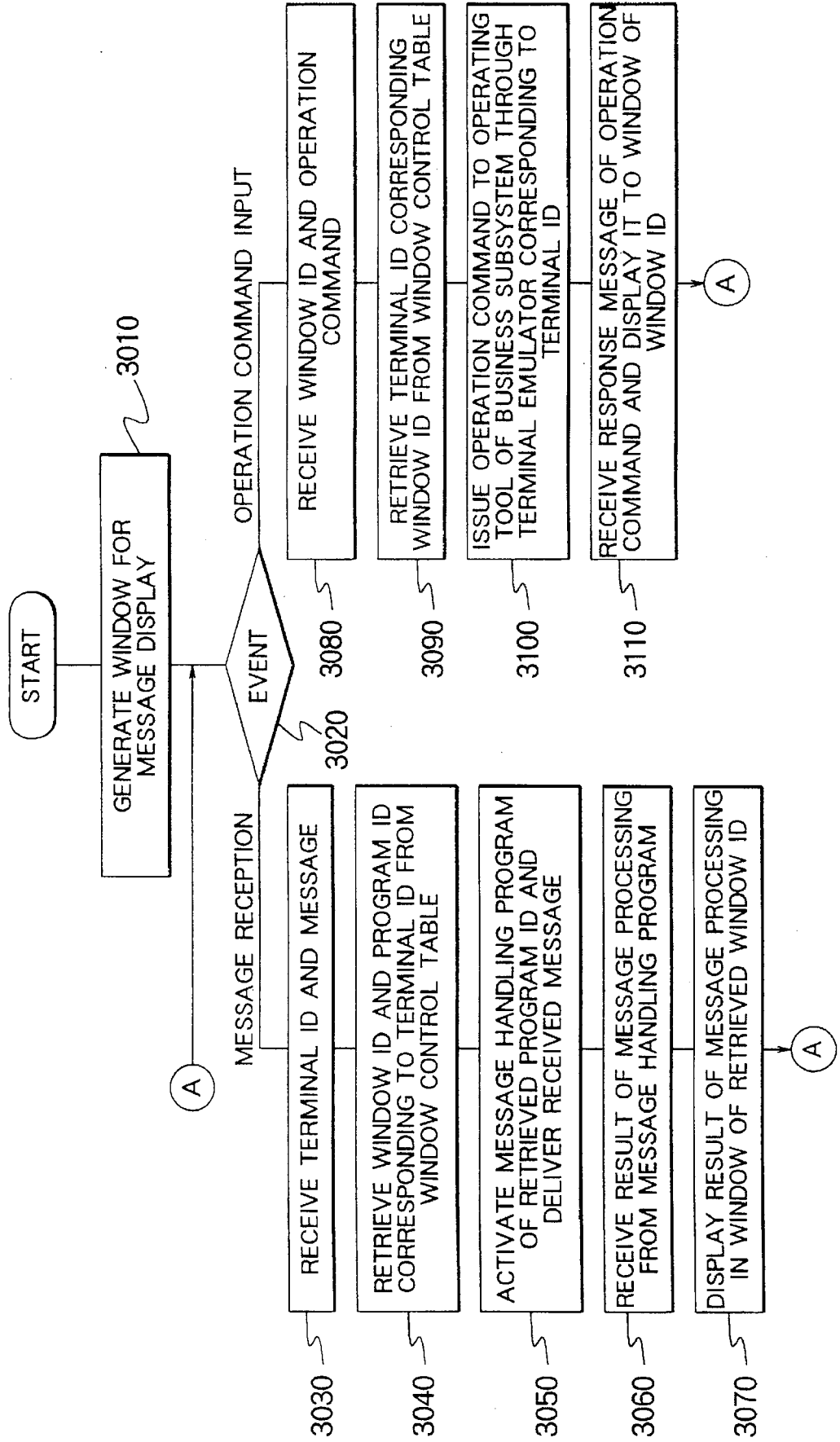
FIG. 3 is a diagram showing a processing flow of a message handling control portion forming the operating tool group handling portion in FIG. 2.
Figure 4:
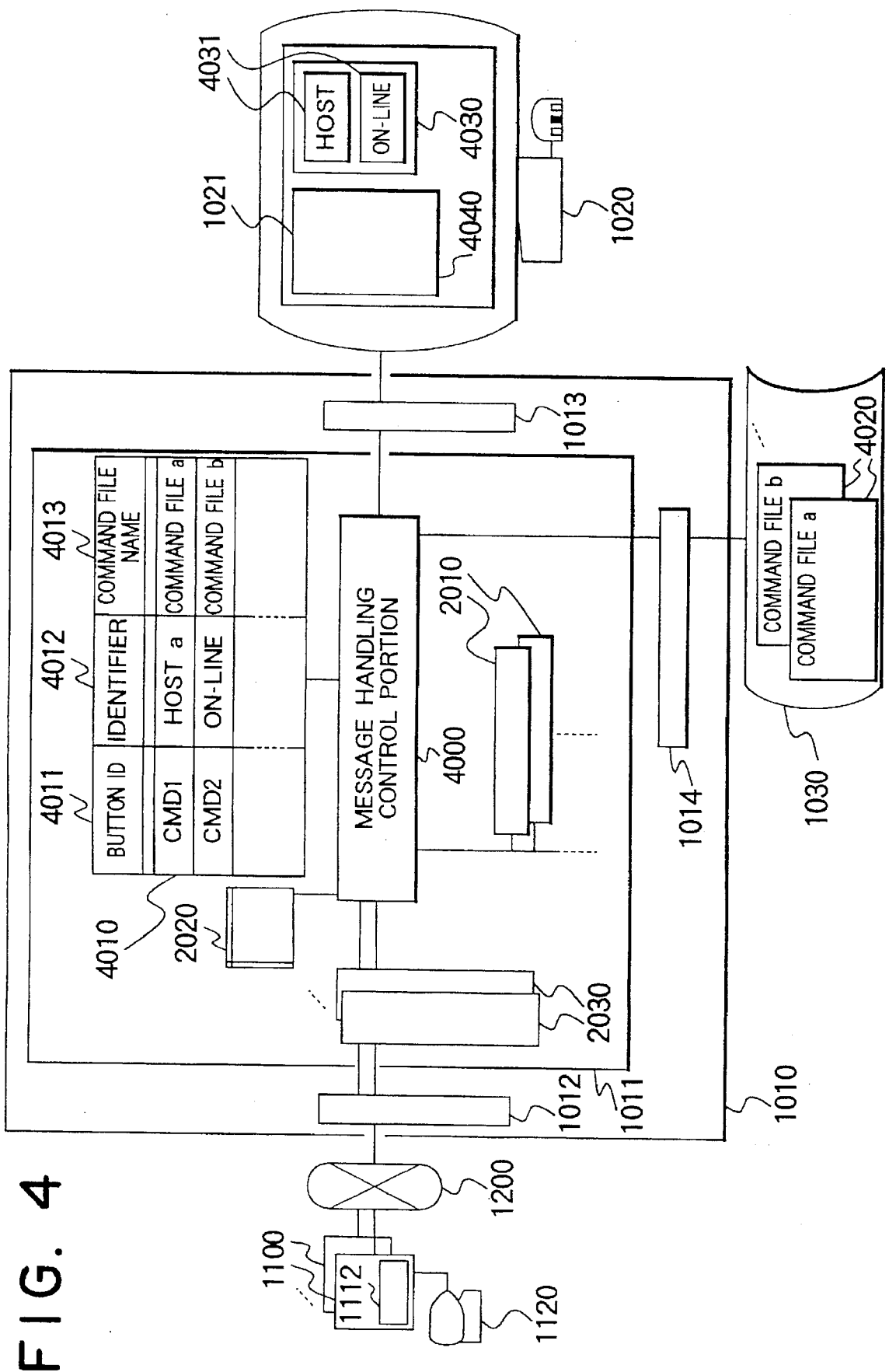
FIG. 4 is a diagram showing a structure of a second embodiment of the operating tool group handling portion forming the unified system operating system in FIG. 1.
Figure 5:
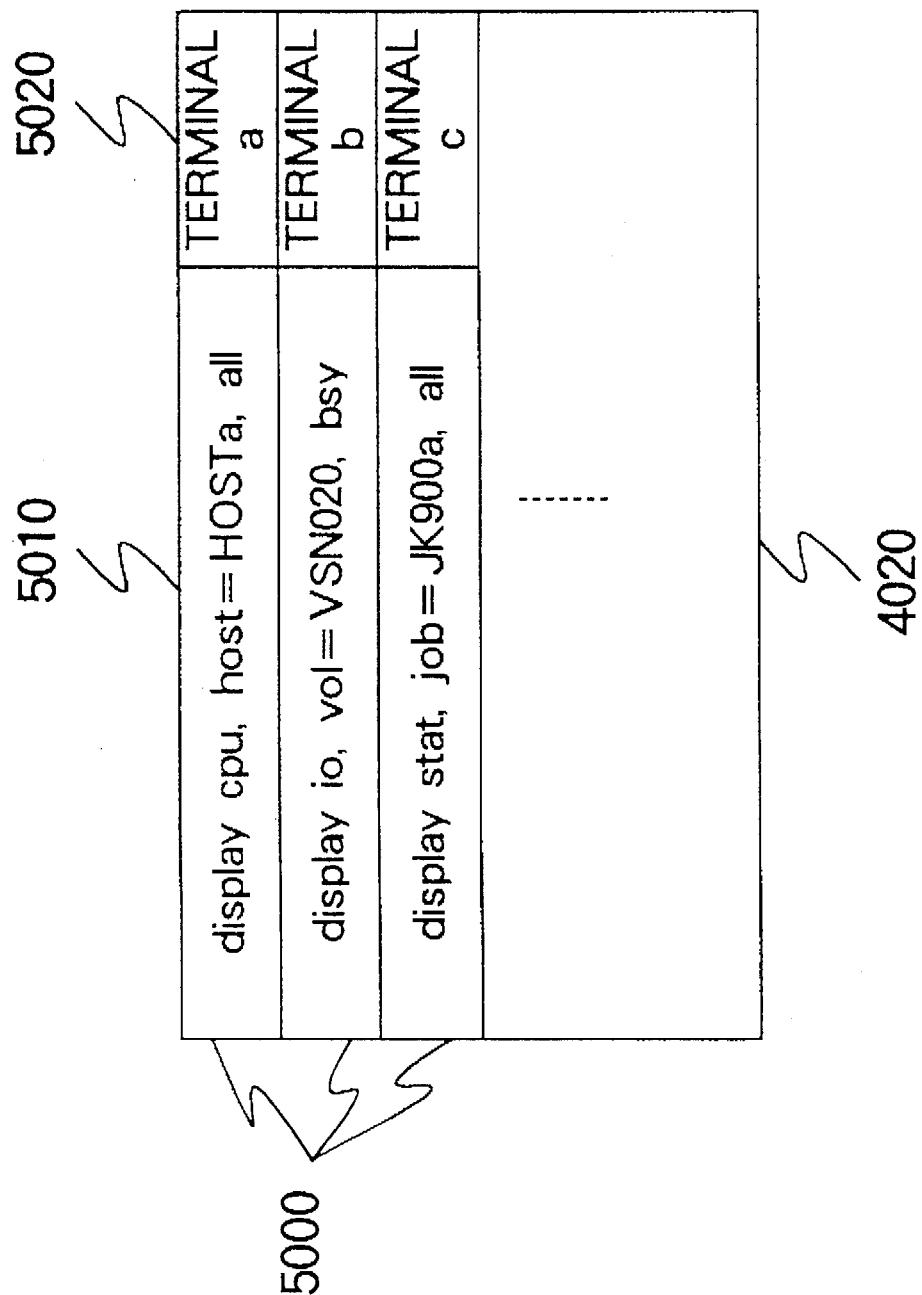
FIG. 5 is a diagram showing a file structure of a command file in FIG. 4.
Figure 6:
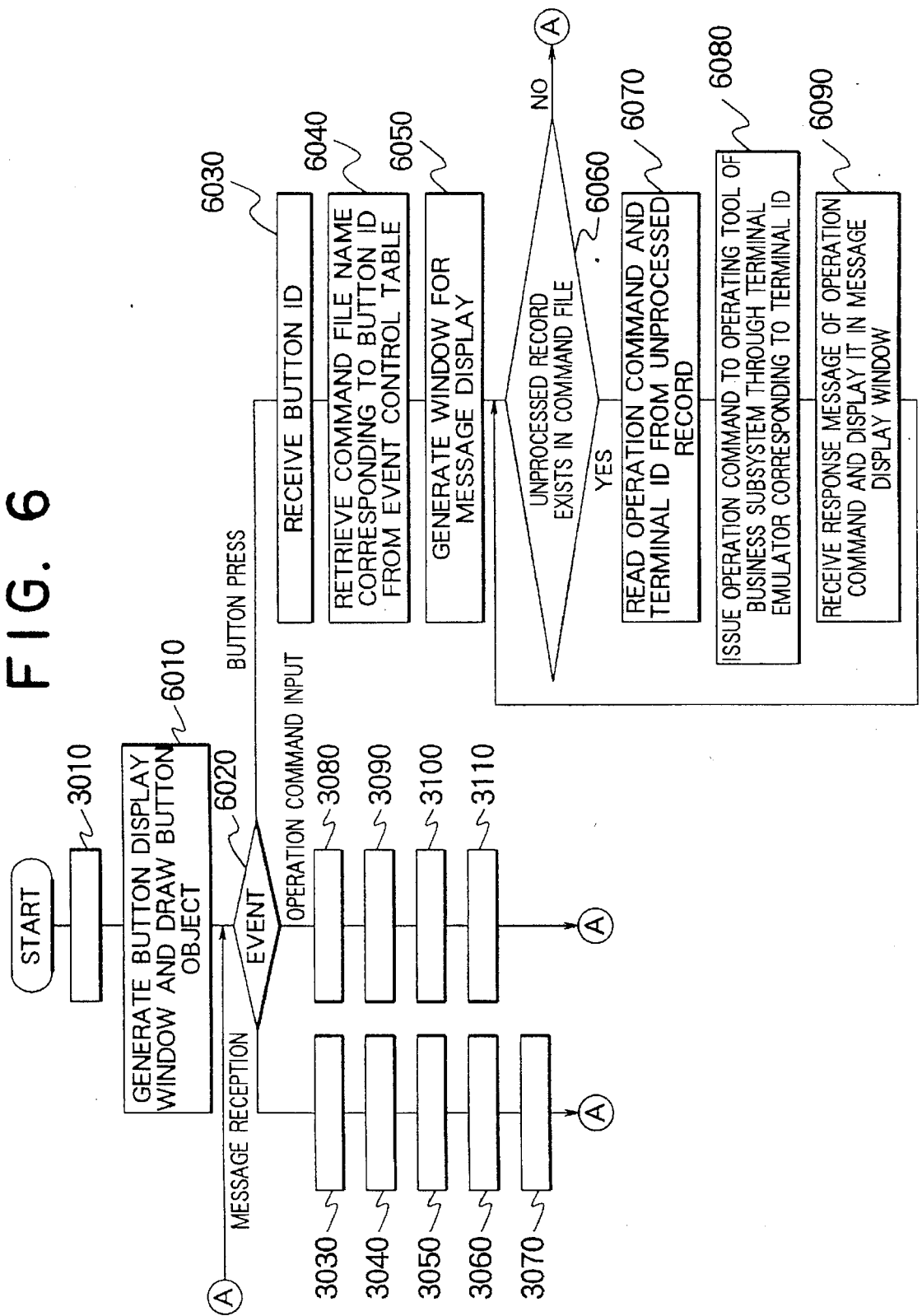
FIG. 6 is a diagram showing a processing flow of the message handling control portion forming the operating tool group handling portion in FIG. 4.
Figure 7:
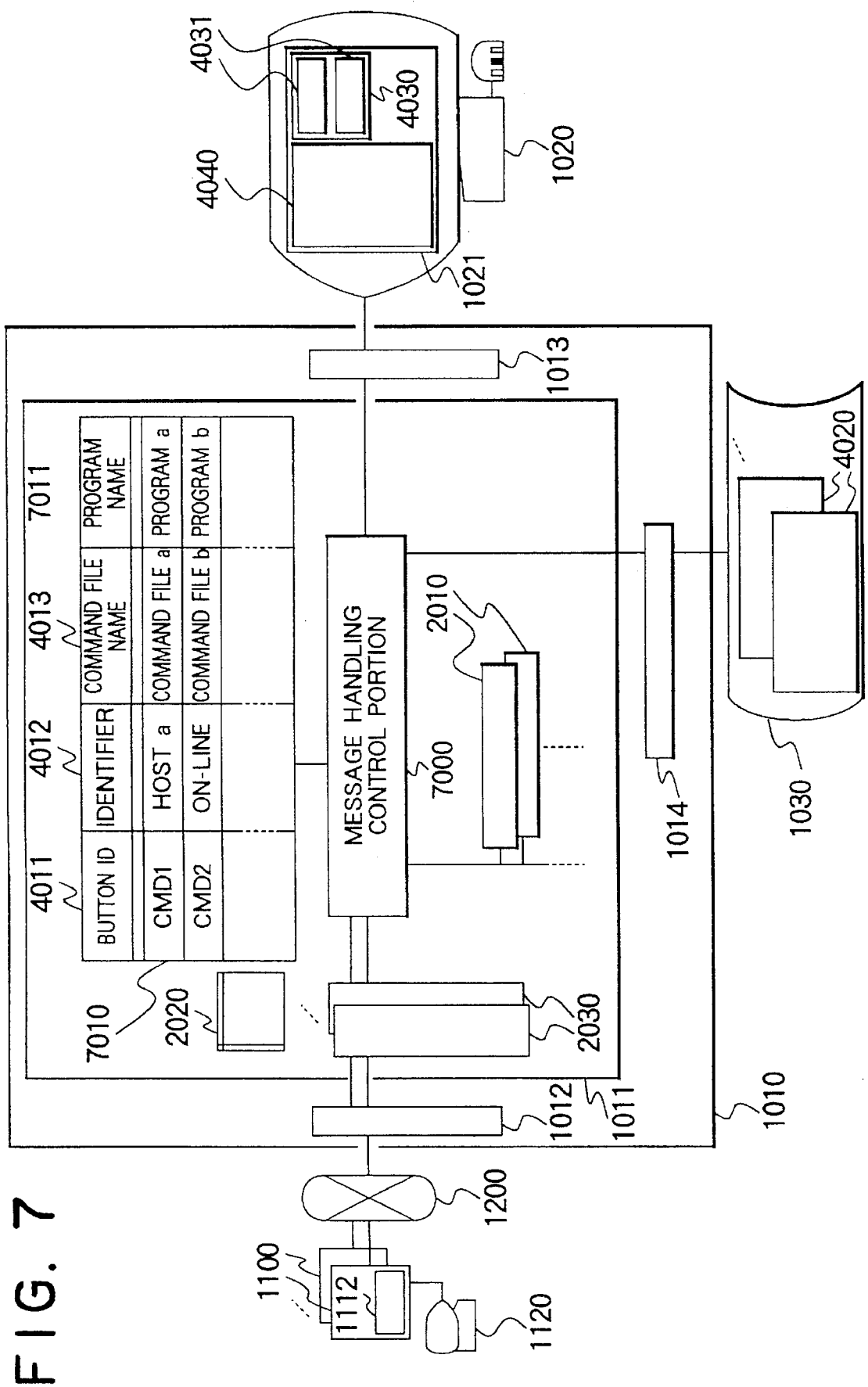
FIG. 7 is a diagram showing a structure of a third embodiment of the operating tool group handling portion forming the unified system operating system in FIG. 1.
Figure 8:
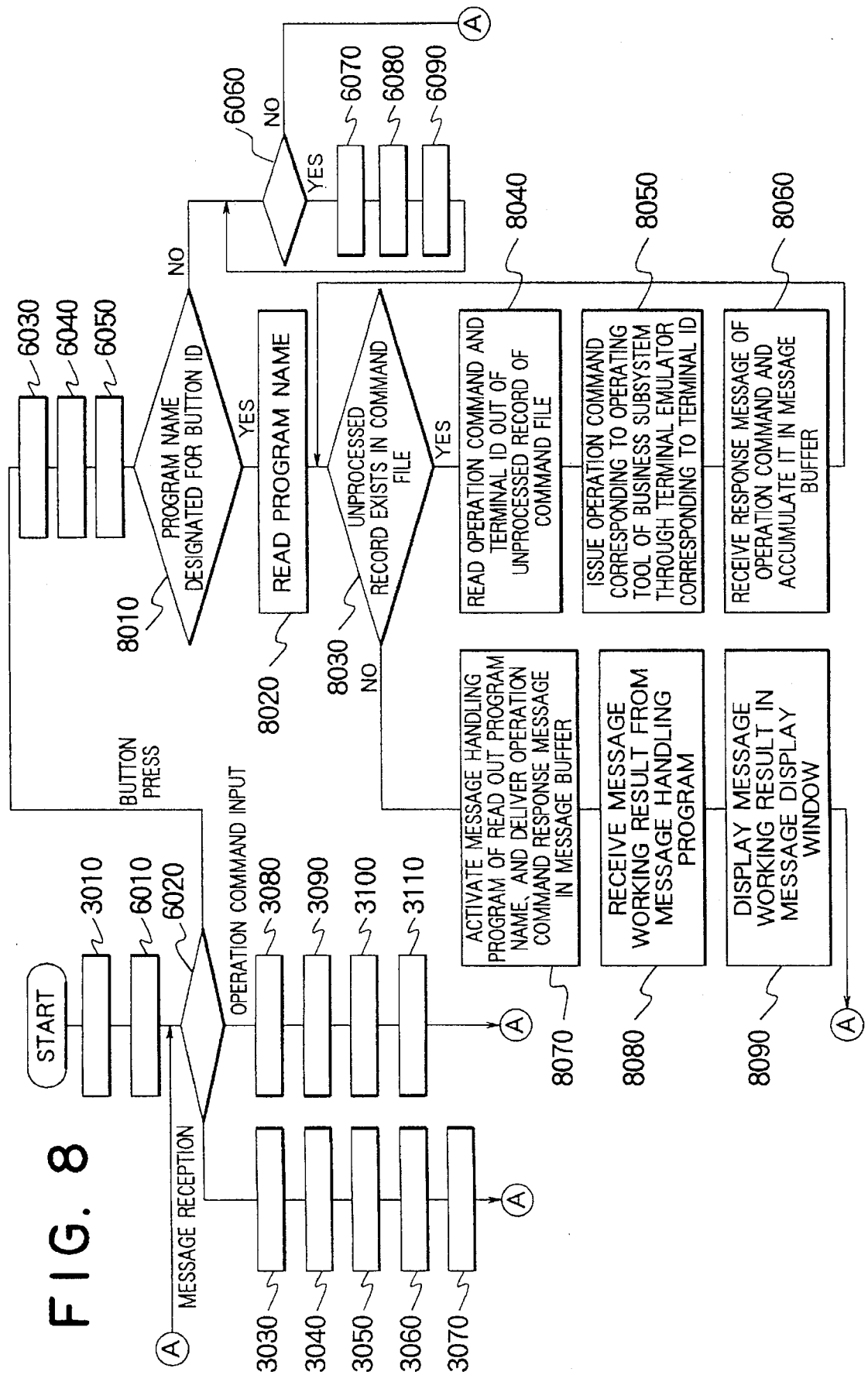
FIG. 8 is a diagram showing a processing flow of the message handling control portion forming the operating tool group handling portion in FIG. 7.
Figure 9:
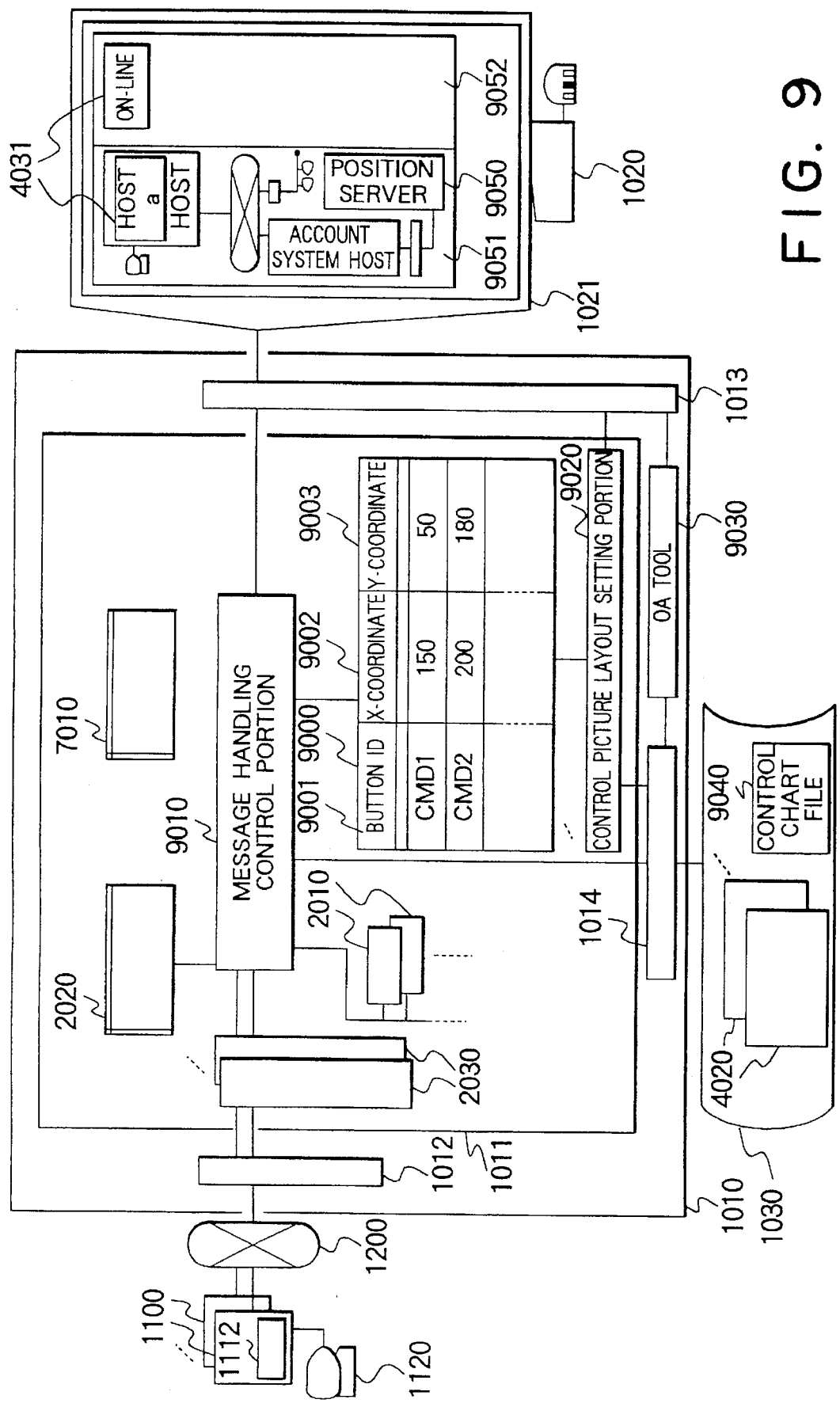
FIG. 9 is a diagram showing a structure of a fourth embodiment of the operating tool group handling portion forming the unified system operating system in FIG. 1.
Figure 10:
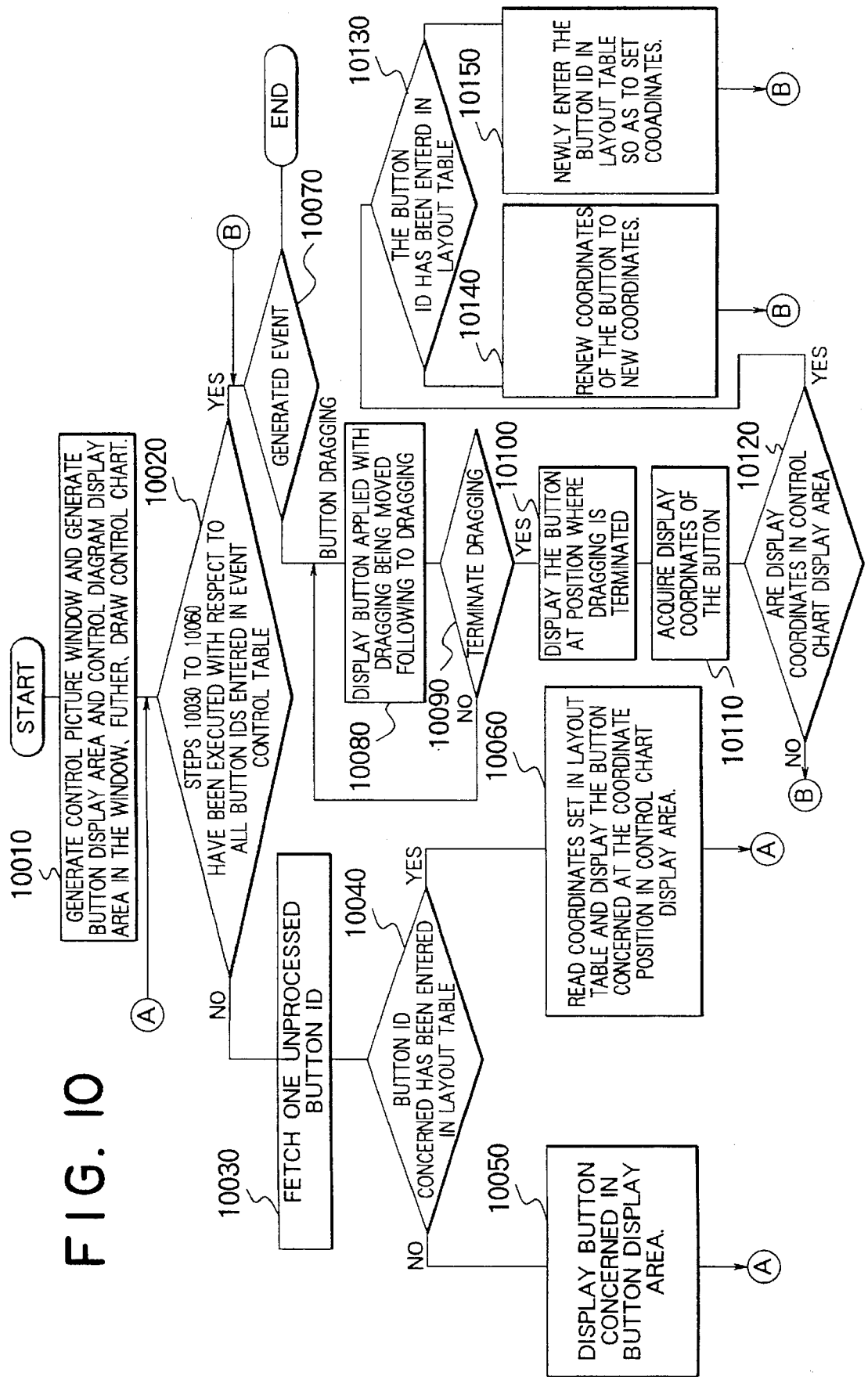
FIG. 10 is a diagram showing a processing flow of a control picture layout setting portion forming the operating tool group handling portion in FIG. 9.

Embodiments of the present invention will be described with reference to FIG. 1 to FIG. 11. FIG. 1 shows a general system structure for explaining a unified system operating system 1000 according to the present invention, and a first embodiment of the unified system operating system 1000 is shown in FIGS. 2 and 3. A second embodiment is shown in FIGS. 4 to 6, a third embodiment is shown in FIGS. 7 and 8, and a fourth embodiment is shown in FIGS. 9 to 11.

FIG. 1 shows a general system structure surrounding the unified system operating system 1000. The unified system operating system 1000 is a system for unifying the operations of business subsystem groups 1100 for executing various business processing such as a bank account system and a fund and bond system and work monitoring of system resources. Each of respective business subsystems 1100 is composed of a computer 1110 for executing a business processing program group 1111 corresponding to a business served by the business subsystem, a storage unit 1130 for storing a business data file 1132 required for executing the business processing program group 1111 and a terminal unit 1120 for performing operation of the computer 1110 such as start and stop of the computer 1110 and start of the business processing program group 1111.

Further, an operating tool 1112 structured in the computer 1110 controls the operation of the business subsystem 1100 such as monitoring of the working state of system resources (the computer 1110, the storage unit 1130, the business control file 1131, the business data file 1132, the terminal unit 1120) forming the business subsystem 1100, execution scheduling of the business processing program group 1111 and automatic execution in accordance with the schedule. The interface between the operating tool 1112 and an operator (such as display of working state data, issuance of operation command such as inquiry on the working state, response display thereof and schedule registration of the business processing program group 1111) is performed through the terminal unit 1120. The collected working state data and registration schedule are stored and accumulated in the operation control file group 1131 in the storage unit 1130.

The operating tool 1112 is closed with the operations of the business subsystem 1100 where it is in existence, and the operating tool 1112 and the terminal unit 1120 are in existence in every business subsystem 1100. Therefore, when an operation command is going to be issued to a certain business subsystem 1100 in case the operations of a plurality of business subsystems 1100 are controlled, the burden of operation imposed on an operator is large in such a way that the operator has to issue an exclusive operation command from the terminal unit 1120 exclusive for the business subsystem 1100. Further, when he business subsystem groups 1100 are scattered regionally, it is required to arrange an operator at every site.

The unified system operating system 1000 is a system for unifying and aggregating the functions of the operating tools 1112 of respective business subsystems 100 in one window (a graphical terminal unit 1020) and unifying and controlling the work monitoring of system resources of the business subsystem groups 1100 and the operation of the business processing program groups 1111. The unified system operating system 1000 is composed of a computer 1010, a graphical terminal unit 1020 corresponding to a multiwindow and a storage device 1030, and is connected to the business subsystem groups 1100 through a communication network 1200.

The computer 1010 is composed of an operating tool group handling portion 1011 for performing issuance of a command to the operating tool 1112 of the business subsystem group 1100, processing of a message from the operating tool 1112 and so on, a communication control portion 1012 for controlling communication with the business subsystem groups 1100, a terminal control portion 1013 for controlling data display onto the graphical terminal unit 1020 and events from the graphical terminal unit 1020 and a file control portion 1014 for controlling input/output of data to and from files stored in the storage device 1030. The detailed structure of the operating tool group handling portion 1011 is shown in FIG. 2 for the first embodiment, in FIG. 4 for the second embodiment, in FIG. 7 for the third embodiment, and in FIG. 9 for the fourth embodiment, and the description thereof will be made later.

The graphical terminal unit 1020 is a unit for displaying display data outputted by the operating tool group handling portion 1011 in a multiwindow, and unifies and aggregates the terminal unit groups 1120 of the business subsystem groups 1100 in the present terminal unit 1020. The storage device 1030 stores data required in the operating tool group handling portion 1011. The data stored in the storage device 1030 will be described later in detailed description of the embodiments.

FIG. 2 shows a structure of the first embodiment of the operating tool group handling portion 1011 shown in FIG. 1. Further, FIG. 2 also shows a display example of a window group 1022 in a window display portion 1021 of the graphical terminal unit 1020. The operating tool group handling portion 1011 in the first embodiment is composed of a message handling control portion 2000, a message handling program group 2010, a window control table 2020 and a terminal emulator group 2030.

The message handling control portion 2000 is a portion for performing processing control of a message from an operating control tool 1112 of the business subsystem group 1100 and issuance of a command to the operating tool 1112 and also performing response control, and a detailed processing flow will be described later with reference to FIG. 3. The message handling program group 2010 is a working program of a message such as graphical processing, listing and statistical computation processing of messages from the operating tool 1112 of the business subsystem group 1100.

The window control table 2020 is a table for prescribing information by which message handling program 2010 the message from the operating tool 1112 of the business subsystem group 1100 is to be processed and in which window 1022 of the window display portion 1021 of the graphical terminal unit 1020 the processed message is to be displayed.

The terminal emulator group 2030 is a program group for emulating the operation of the terminal unit 1120 of the business subsystem group 1100 software-wise. By means of the present terminal emulator 2030, the unified system operating system 1000 appears as one terminal unit having the same function as that of the terminal unit 1120 of the business subsystem 1100 thereof when viewed from the side of the business subsystem 1100.

The window control table 2020 is composed of a terminal ID area 2021, a window ID area 2022 and a program ID area 2023. The terminal ID area 2021 is an area for storing terminal identifying information of the unified system operating system 1000 made virtual in the terminal unit 1120 of the business subsystem 1100 by means of the terminal emulator 2030. The terminal identifying information is a terminal node identifier defined by system generation when a computer and a terminal are connected to each other. The terminal identifying information is described hereinafter as,terminal ID, The window ID area 2022 is an area for storing a window identifier (hereinafter referred to as window ID) for identifying the window group 1022 of the window display portion 1021 of the graphical terminal unit 1020. The program ID area 2023 is an area for storing names of the message handling programs 2010 (hereinafter referred to as program ID) for processing the message from the operating tool 1112 of the business subsystem group 1100 fetched at the terminal ID. Data setting to the window control table 2020 is made when the present system (the unified system operating system 1000) is built.

The motion of the operating tool group handling portion 1011 of the unified system operating system 1000 in the first embodiment is described briefly as follows.

The message group of the operating tool 1112 of the business subsystem group 1100 is taken into the message handling control portion 2000 through the terminal emulator 2030. The present control portion 2000 activates the message handling program 2010 designated by the program ID of the window control table 2020 so as to process the message, and displays the output data thereof in the window 1022 of the window display portion 1021 of the graphical terminal unit 1020 designated by the window ID of the window control table 2020. Further, the message handling control portion 2000 receives an operation command inputted from the window 1022, discriminates the terminal ID from the window control table 2020 and issues an operation command to the operating tool 1112 of the business subsystem 1100 through the terminal emulator 2030. Then, it displays a response message from the operating tool 1112 of the business subsystem 1100 in the window 1022.

FIG. 3 shows a processing flow of the message handling control portion 2000 in the first embodiment shown in FIG. 2. The present control portion 2000 is activated simultaneously with build-up of the power source of the computer 1010, and is stopped simultaneously with shutdown of the computer 1010. When the message handling control portion 2000 is activated, the window ID of the window control table 2020 is referred to and the window 1022 which is a physical substance is generated correspondingly to the window ID in the window display portion 1021 of the graphical terminal unit 1020 through the terminal control portion 1013 (step 3010). After the window is generated, event wait is produced (step 3020).

There are two types of events that are handled here. One is an event of receiving a message of the operating tool 1112 of the business subsystem 1100 through the terminal emulator 2030. Another is an operation command input event from the window 1022 generated in the graphical terminal unit 1020 into the operating tool 1112 of the business subsystem 1100.

When the message reception event is received in the step 3020, step 3030 to step 3070 are executed in consecutive order, and the process is returned to the step 3020 after execution and a next event is waited for. When an operation command input event is received in the step 3020, step 3080 to step 3110 are executed in consecutive order, and the process is returned to the step 3020 after execution, and a next event is waited for.

A processing flow when the message reception event is received in the step 3020 is such that the terminal ID and the message of the operating tool 1112 of the business subsystem 1100 are received from the terminal emulator 2030 first in the step 3030. In the step 3040, the window ID and the program ID corresponding to the terminal ID are retrieved from the window control table 2020. In the step 3050, the message handling program 2010 of the retrieved program ID is activated and the message received in the step 3030 is delivered to the program 2010 concerned. In the step 3060, the result of processing the message (display data to the window 1022) in the message handling program 2010 is received from the program 2010 concerned. In the step 3070, the result of processing the message received in the previous step (step 3060) is displayed in the window 1022 of the window ID retrieved in the step 3040 through the terminal control portion 1013.

A processing flow when the operation command input event is received in the step 3020 is such that the window ID and the operation command are received first from the graphical terminal unit 1020 through the terminal control portion 1013 in the step 3080. In the step 3090, the terminal ID corresponding to the window ID is retrieved from the window control table 2020. In the step 3100, the received operation command is issued to the operating tool 1112 of the business subsystem 1100 through the terminal emulator 2030 corresponding to the retrieved terminal ID. In the step 3110, the response message of the operation command concerned from the operating tool 1112 of the business subsystem 1100 is received, and displayed in the window 1022 of the window ID received in the step 3080 through the terminal control portion 1013.

As described above, according to the first embodiment of the unified system Operating system 1000 related to the present invention, it is possible to aggregate the functions of the operating tools 1112 of respective business subsystems 1100 in one window (the graphical terminal unit 1020) and to control monitoring of working of system resources of a plurality of business subsystem groups 1100 and operation of business processing program groups 1111 in a unified manner by one terminal unit. Accordingly, even when a plurality of business subsystems 1100 are scattered regionally, it is possible to aggregate operating sites at one location. Further, an intensive effect of terminal unit groups 1120 for the operation of the business subsystem 1100 is also available, and only a small space is required in the operating site.

The second embodiment of a unified system operating system 1000 according to the present invention will be described with reference to FIGS. 4 to 6. In the second embodiment, labor saving in the operation command input operation from the graphical terminal unit 1020 in the first embodiment is aimed at. For example, when a case that a CPU utilization factor of respective business subsystems 1100 is inquired with a command is considered, business subsystem 1100 portion's operation commands have to be issued from respective windows 1022 in the first embodiment, but it is arranged to complete the issuance in one operation in the second embodiment. To be more specific, a series of operation command groups are registered in advance and an object (a command button in the present embodiment) on the window display portion 1021 of the graphical terminal unit 1020 is pointed, thereby to issue the registered operation command group automatically.

FIG. 4 shows the second embodiment of the operating tool group handling portion 1011 shown in FIG. 1. What differs from the structure in the first embodiment (FIG. 2) is the fact that there are newly provided an event control table 4010 in the operating tool group handling portion 1011 and a command file group 4020 in the storage device 1030 and a processing flow of a message handling control portion 4000 has been modified. Furthermore, there are newly provided a command button display window 4030, a command button object group 4031 displayed on that window 4030 and a window 4040 for displaying the response message of the operation command group in the window display portion 1021 of the graphical terminal unit 1020. In the second embodiment, when the command button 4031 is pointed by an operator, the operation command group corresponding to that command button 4031 is read out of the command file group 4020, a series of operation commands are issued automatically to the operating tool 1112 of respective business subsystems 1100, and the response message thereof is displayed in the message display window 4040.

First, the structure of the event control table 4010 shown in FIG. 4 will be described. The present table 4010 is composed of a button ID area 4011, an identifier area 4012 and a command file name area 4013. The button ID area 4011 is an area for storing a button object identifier (hereinafter referred to as a button ID) for identifying the command button object 4031. The identifier area 4012 is an area for storing an identifier given to the command button object 4031. The command file name area 4013 is an area for storing, when the command button 4030 is pointed, a command file 4020 name where a series of operation command groups corresponding to the button 4030 are stored. Data setting to the event control table 4010 is made when the present system (the unified system operating system 1000) is built.

FIG. 5 shows a structural example of the command file 4020 shown in FIG. 4. The present file 4020 is formed of a plurality of records 5000, and one record 5000 is allocated to every operation command. Each record 5000 is composed of a command description area 5010 and a terminal ID area 5020. The command description area 5010 is an area for entering an operation command issued to the operating tool 1112 of the business subsystem group 1100. The terminal ID area 5020 is an area for storing information similar to the terminal ID area 2021 of the window control table 2020 described with reference to FIG. 2, i.e., terminal identifying information (terminal ID) of the unified system operating system 1000 made virtual in the business subsystem 1100 which is the other party to issue the operation command described in the command description area 5010. Data setting of respective record groups 5000 of the command file group 4020 is also made when the present system (the unified system operating system 1000) is built.

FIG. 6 shows a processing flow of the message handling control portion 4000 in the second embodiment shown in FIG. 4. The present control portion 4000 is activated simultaneously with build-up of the power source of the computer 1010 and is stopped simultaneously with shutdown of the computer 1010 similarly to the first embodiment.

The processing flow of the message handling control portion 4000 shown in FIG. 6 is obtained by adding several steps (from step 6010 to step 6090) to the processing flow of the message handling control portion 2000 in the first embodiment shown in FIG. 3 and modifying the same. Hereinafter, those particular portions that are added and modified will be described.

When the message handling control portion 4000 is activated, a button display window 4030 is generated in the window display portion 1021 of the graphical terminal unit 1020 and a button object 4031 is displayed as data with the display identifier thereof set in the identifier area 4012 of the event control table 4010 correspondingly to the button ID by referring to the button ID of the event control table 4010 in step 6010 after executing the step 3010. After generation of the window and display of the button object, event wait is produced (step 6020).

The step 6020 is produced by modifying the step 3020 shown in FIG. 3, and there are three types of events that are handled in the step 6020. One of them is an event of receiving a message of the operating tool 1112 of the business subsystem 1100 through the terminal emulator 2030 and the second one is an operation command input event into the operating tool 1112 of the business subsystem 1100 from the window 1022 generated in the graphical terminal unit 1020. Remaining another event is a pointing (button press) event of the button object 4031.

The former two events are the same as the event in the first embodiment, and when these events are received in the step 6020, the step groups to be executed successively in the next place are from the step 3030 to the step 3070 (at time of message reception event) or from the step 3080 to the step 3110 (at time of operation command input event) shown in FIG. 3 similarly to the first embodiment. After the step 3070 or the step 3110 is executed, the process is returned to the step 6020 and a next event is waited for.

When the button press event is received in the step 6020, the step 6030 to the step 6090 are executed successively, and the process is returned to the step 6020 after execution and a next event is waited for. In the Step 6030, the button ID is received from the graphical terminal unit 1020 through the terminal control portion 1013. In the step 6040, the command file 4020 name corresponding to the button ID is retrieved from the event control table 4010. In the step 6050, the window 4040 for message display is generated in the window display portion 1021 of the graphical terminal unit 1020. Next, in the step 6060, it is checked whether there is a record 5000 which is not read and has not executed the step 6070 to the step 6090 in the command file 4020 retrieved in the step 6040 or not.

In case processing has been completed with respect to all of the records 5000, the process is returned to the step 6020 and a next event is waited for.

When there is an unprocessed record 5000 in the step 6060, the step 6070 to the step 6090 are executed successively. In the step 6070, the operation command and the terminal ID are read out of the unprocessed record 5000 of the command file 4020. In the step 6080, the operation command read in the step 6070 is issued to the operating tool 1112 of the business subsystem 1100 through the terminal emulator 2030 corresponding to the terminal ID retrieved in the step 6070. In the step 6090, the response message of the operation command from the operating tool 1112 of the business subsystem 1100 is received, and displayed in the window 4040 for message display generated in the step 6050 through the terminal control portion 1013. After the step 6090 is executed, the process is returned to the step 6060 and shifted to processing of the next unprocessed record 5000.

As described, according to the second embodiment of the unified system operating system 1000, it becomes possible to execute a series of operation command groups for a plurality of business subsystem groups 1100 in one operation (button press) in addition to the effect shown in the first embodiment. Accordingly, an effect of labor saving in operation command input operation from the graphical terminal unit 1020 is produced by making operations from an appropriate window 1022 into one operation by the number of operation commands in the first embodiment.

A third embodiment of a unified system operating system 1000 according to the present invention will be described with reference to FIG. 7 and FIG. 8. In the third embodiment, response messages of a series of operation commands executed automatically in the second embodiment are displayed by activating the message handling program 2010 and processing a series of message groups visually as in the first embodiment.

FIG. 7 shows the third embodiment of the operating tool group handling portion 1011 shown in FIG. 1. What differs from the structure in the second embodiment is the fact that a program name area 7011 is newly provided in the event control table 4010 shown in FIG. 4 so as to use it as an event control table 7010 shown in FIG. 7, and a processing flow of a message handling control portion 7000 is modified as shown in FIG. 8. The third embodiment will be described hereinafter with priority given to the different points from the second embodiment.

First, the structure of the event control table 7010 shown in FIG. 7 will be described. The event control table 7010 is composed of a button ID area 4011, an identifier area 4012, a command file name area 4013 and a program name area 7011. The former three areas 4011, 4012 and 4013 have the same functions as those of respective areas of the event control table 4010 in FIG. 4 in the second embodiment. The program name area 7011 is an area for storing the message handling program 2010 name (hereinafter referred to as a program ID) for processing response messages of a series of operation commands executed automatically. Data setting to the present table 7010 is made when the present system (the unified system operating system 1000) is built.

FIG. 8 shows a processing flow of the message handling control portion 7000 in the third embodiment shown in FIG. 7. The present control portion 7000 is activated simultaneously with build-up of the power source of the computer 1010 and stopped simultaneously with shutdown of the computer 1010 similarly to the second embodiment.

The processing flow of the message handling control portion 7000 shown in FIG. 8 is obtained by adding several steps (from step 8010 to step 8090) to the processing flow of the message handling control portion 4000 in the second embodiment shown in FIG. 6 and modifying the same. Hereinafter, those particular portions that are added and modified will be described.

After the step 6050 is executed, it is determined in the step 8010 whether the message handling program 2010 name has been set in the program name area 7011 for the button ID received in the step 6030 by retrieving the event control table 7010. If it has not been set, the step 6060 to the step 6090 are executed similarly to the second embodiment. If it has been set, the step 8020 to the step 8090 are executed.

In the step 8020, the message handling program 2010 name corresponding to the button ID received in the step 6030 is read out of the event control table 7010. Next, in the step 8030, it is checked whether a record 5000 which has not executed the step 8040 to the step 8090 is included in the command file 4020 retrieved in the step 6040. When there is an unprocessed record 5000, the step 8040 to the step 8060 are executed in a consecutive order, and the process is returned to the step 8030 and shifted to the processing of a next unprocessed record. When it is determined in the step 8030 that all of the records 5000 have been processed, the step 8070 to the step 8090 are executed in a consecutive order, and the process is returned to the step 6020 and the next event is waited for.

The processing flow when it is determined in the step 8030 that there is an unprocessed record 5000 is such that the operation command and the terminal ID are read out of the unprocessed record 5000 of the command file 4020 first in the step 8040. In the step 8050, the operation command read out in the step 8040 is issued to the operating tool 1112 of the business subsystem 1100 through the terminal emulator 2030 corresponding to the terminal ID read in the step 8040. In the step 8060, the response message of the operation command concerned from the operating tool 1112 of the business subsystem 1100 is received and stored in the message buffer. After the step 8060 is executed, the process is returned to the step 8030 and shifted to the processing of the next unprocessed record 5000.

The processing flow when it is determined in the step 8030 that all of the records 5000 have been processed is such that the message handling program 2010 of the program name read in the step 8020 is activated and the response message group stored in the message buffer is delivered to the program 2010 concerned first in the step 8070. In the step 8080, the result of processing the message in the message handling program 2010 (display data in the window 4040 for message display) is received from the program 2010 concerned. In the step 8090, the result of processing the message received in the previous step (the step 80807 is displayed in the window 4040 for message display through the terminal control portion 1013.

As described, according to the third embodiment of the unified system operating system 1000, it becomes possible to process the response message of a series of operation commands executed automatically in the second embodiment visually so as to be displayed by the message handling program 2010.

The fourth embodiment of the unified system operating system 1000 according to the present invention will be described with reference to FIGS. 9 to 11. In the fourth embodiment, the command button object group 4031 in the second or the third embodiment is arranged on a text or an illustration such as a system structural diagram formed optionally with an OA tool 9030 which a user is accustomed to use normally so that the function of the command button object group 4031 equivalent to the second or the third embodiment is performed.

FIG. 9 shows the fourth embodiment of the operating tool group handling portion 1011 shown in FIG. 1. What differs from the structure in the third embodiment is the fact that a button layout table 9000 and a control picture layout setting portion 9020 are newly provided and the processing flow of a message handling control portion 9010 is modified as shown in FIG. 11. Further, the OA tool 9030 for drawing a text or an illustration for control such as a system structural diagram is provided in the computer 1010 of the unified system operating system 1000, and a control chart file 9040 for storing text and illustration data drawn with the OA tool 9030 is provided in the storage portion 1030.

Furthermore, there are provided a control picture window 9050 in the window display portion 1021 of the graphical terminal unit 1020 and a control chart display area 9051 and a button display area 9052 in the window 9050. The control chart display area 9051 is an area for displaying a text or an illustration for control drawn with the OA tool 9030 and stored in the control chart file 9040. The button object group 4031 is displayed on a text or an illustration for control displayed in the control chart display area 9051 or in the button display area 9052. The function of the button object group 4031 is such that the operation command groups stored in the command file 4020 corresponding to the button ID are executed in consecutive order by button press similarly to the second or the third embodiment. It is set in which area of the control chart display area 9051 and the button display area 9052 the button object group 4031 is to be displayed by means of the control picture layout setting portion 9020. The processing flow of the setting portion 9020 will be described later with reference to FIG. 10.

The structure of the button layout table 9000 shown in FIG. 9 will be described. The present table 9000 is composed of a button ID area 9001, an X-coordinate area 9002 and a Y-coordinate area 9003. The button ID area 9001 has the same function as that of the button ID area 4011 of the event control table 7010 shown in FIG. 7 in the third embodiment. The X-coordinate area 9002 and the Y-coordinate area 9003 are areas for storing coordinate positions in an X (horizontal) direction and a Y (longitudinal) direction in the control chart display area 9051 of the button object 4031 corresponding to the button ID, respectively. Data setting to the present table is made by the control picture layout setting portion 9020.

FIG. 10 shows a processing flow of the control picture layout setting portion 9020. The setting portion 9020 is activated from the graphical terminal unit 1020 through the terminal control portion 1013. When activation is applied, the control picture window 9050 is generated in the window display portion 1021 of the graphical terminal unit 1020, and the control chart display area 9051 and the button display area 9052 are generated in the present window 9050 in step 10010. In the present step 10010, the text and the illustration for control drawn with the OA tool 9030 and stored in the control chart file 9040 are displayed further in the control picture window 9050.

Next, in step 10020, it is determined whether step 10030 to step 10060 have been executed or not with respect to all the button IDs entered in the event control table 7010. When there is an unprocessed button ID, the step 10030 to the step 10060 are executed. When all of the button IDs have been processed, step 10070 to step 10150 are executed so as to process to stick the button object group 4031 onto a text or an illustration for control displayed in the control chart display area 9051.

In a processing flow when it is determined in the step 10020 that there is an unprocessed button ID, the unprocessed button ID is taken out of the control table 7010 first in the step 10030. In the step 10040, it is checked whether the button ID concerned has been entered in the button layout table 9000 or not. The step 10050 is executed when entry has not been made, and the step 10060 is executed when entry has been made. In the step 10050, the button object 4031 corresponding to the button ID concerned is displayed in the button display area 9052. After the step 10050 is executed, the process is returned to the step 10020, and shifted to the processing of the next button ID. In the step 10060, the coordinate position of the button ID concerned in the control chart display area 9051 is read out of the button layout table 9000, and the button object 4031 corresponding to the button ID is displayed at the coordinate position in the control chart display area 9051. After the step 10060 is executed, the process is returned to the step 10020 and shifted to the processing of the next button ID.

When it is determined in the step 10020 that processing has been completed with respect to all of the processing button IDs, event wait state is produced in the step 10070. Two events generated from the graphical terminal unit 1020 are handled here. One is a dragging event of the button object group 4031 and another is a setting end event.

When the setting end event is received in the step 10070, processing of the setting portion 9020 is terminated.

When the dragging event of the button object group 4031 is received in the step 10070, the button object 4031 applied with dragging is displayed movably following the dragging (a step 10080). Dragging is performed by a pointing device such as a mouse connected to the graphical terminal unit 1020. The step 10080 is executed until dragging of the button object 4031 is terminated (a step 10090). When dragging is terminated, the button object 4031 is displayed at a position where dragging is terminated in step 10100.

Next, in the step 10110, the display coordinates of the button object 4031 are acquired. A position such as a position of center of gravity, a position at the left upper corner of the button object 4031 or the like is determined to be the reference in advance, thereby to adopt the coordinates of the determined point as the coordinates to be acquired. It is checked whether the display position is the control chart display area 9051 (the step 10120), and, when the display position is within the present area 9051, the step 10130 to the step 10150 are executed. When it is outside the control chart display area 9051, the process is returned to the step 10070 and the next event is waited for.

In the step 10130, it is checked whether the button ID corresponding to the button object 4031 has been entered in the button layout table 9000. The step 10140 is executed when entry has been made, and the step 10150 is executed when entry has not been made. In the step 10140, the coordinates of the button ID of the button layout table 9000 (values of the X-coordinate area 9002 and the Y-coordinate area 9003) are renewed to read-out new coordinates. After the step 10140 is executed, the process is returned to the step 10070 and the next event is waited for. In the step 10150, the button ID concerned is entered newly in the button layout table 9000, and read out coordinates are set in the X-coordinate area 9002 and the Y-coordinate area 9003. After the step 10150 is executed, the process is returned to the step 10070 and the next event is waited for.

FIG. 11 shows a part of a processing flow of the message handling control portion 9010 in the fourth embodiment shown in FIG. 9. The processing flow shown in FIG. 11 shows the modification contents of the step 6010 of the processing flow of the message handling control portion 7000 shown in FIG. 8. Namely, the processing flow of the message handling control portion 9010 in the fourth embodiment is obtained by modifying the step 6010 of the processing flow of the message handling control portion 7000 shown in FIG. 8 into the processing flow shown in FIG. 11.

Thus, the present control portion 9010 is activated simultaneously with build-up of the power source of the computer 1010 and stopped simultaneously with shutdown of the computer 1010 similarly to the embodiments described previously. The modified portions will be described hereinafter.

After the step 3010 shown in FIG. 8 is executed, the control picture window 9050 is generated in the window display portion 1021 of the graphical terminal unit 1020 and the control chart display area 9051 and the button display area 9052 are generated in the window 9050 in step 11010. In the step 11010, a text and an illustration for control drawn with the OA tool 9030 and stored in the control chart file 9040 are displayed further in the control picture window 9050.

In next step 11020, it is determined whether step 11030 to step 11060 have been executed or not with respect to all the button IDs which have been entered in the event control table 7010. When there is an unprocessed button ID, the step 11030 to the step 11060 are executed.

In the step 11030, the unprocessed button ID is taken out of the event control table 7010. In the step 11040, it is checked whether the button ID concerned has been entered in the button layout table 9000. The step 11050 is executed when entry has not been made and the step 11060 is executed when entry-has been made. In the step 11050, the button object 4031 corresponding to the button ID concerned is displayed in the button display area 9052.

After the step 11050 is executed, the process is returned to the step 11020 and shifted to the processing of the next button ID. In the step 11060, the coordinate position of the button ID concerned in the control chart display area 9051 is read out of the button layout table 9000, and the button object 4031 corresponding to the button ID concerned is displayed at the coordinate position in the control chart display area 9051.

After the step 11060 is executed, the process is returned to the step 11020 and shifted to the processing of the next button ID. When it is determined in the step 11020 that processing has been completed with respect to all the processing button IDs, the process is shifted to the step 6020 shown in FIG. 8 and respective step groups shown in FIG. 8 are executed thereafter.

As described, according to the fourth embodiment of the unified system operating system 1000, it is possible to arrange the command button object group 4031 in the second or the third embodiment on a text or an illustration (such as a system structural diagram) formed optionally by a user with the OA tool 9030 which it is accustomed to use normally, and to have the function of the command button object group 4031 equivalent to the second or the third embodiment performed. With this, an operation controller of the business subsystem group 1100 can define a picture interface easy to understand for itself, thus making unified operating of the business subsystem group 1100 possible by the picture interface.

According to the present invention, it is possible to aggregate the functions of a plurality of operating tool groups in one terminal unit, and to control monitoring of working of system resources of a plurality of business subsystem groups, system operation and operating of business processing program groups in a unified manner by means of one terminal unit. Accordingly, it is possible to aggregate operating sites at one location even when a plurality of business subsystems are scattered regionally.

Further, only a small space and a small number of personnel are required in an operating site due to the effect of aggregation of terminal unit groups for operating the business subsystem. In unification of operating tool groups, it is possible to operate operating tool groups for which operation methods are different by means of the same interface, and to execute a series of operation command groups in one operation. Hence, there is an effect of labor saving in operating operation. Since the message groups collected in one terminal unit are handled and displayed visually and in an appropriate window, it becomes easy to grasp the system working state and the execution state of the business program, thus producing an effect of reduction of the operation load imposed on an operator. Furthermore, it is possible for an operator to define a picture interface easy to understand for oneself, and it becomes possible to operate the system in a unified manner with the picture interface.

We claim:

1. A tool operation unifying system for a plurality of computer systems which are managed with a plurality of different system management software tools having different fashions of communicating output information, wherein said unifying system comprises a computer having a terminal apparatus, and wherein said computer comprises means for emulating terminals of said plurality of different system management software tools in display windows for operating said plurality of system management software tools, wherein one of said system management software tools comprises a different operating system than an other of said system management tools for generating said different fashions, and means for modifying the output information from said one of said system management software tools in said terminal apparatus to a converted form wherein the output information in said converted form is displayed in said unifying system in a unified fashion consistent with output information from said other of said system management tools, wherein said display windows appear to have a common format to an operator.

2. The tool operation unifying system according to claim 1, wherein said terminal apparatus comprises a multiwindow display apparatus, and wherein said computer further comprises means for making windows of said multiwindow terminal apparatus correspond to said terminals on which it is possible to operate said plurality of system management software tools, respectively, so that said unifying system displays results of modified output information in said converted form in respective ones of said windows in said unified fashion.

3. The tool operation unifying system according to claim 2, wherein said computer comprises a component of said unifying system and further comprises means for converting an operation on said multiwindow terminal apparatus into a plurality of commands respectively suitable for said plurality of system management software tools, and means for displaying output information respondent to said commands from said system management software tools in windows of said multiwindow terminal apparatus, for sending respective commands for said system management software tools by operating said multiwindow terminal apparatus in said unified fashion.

4. The tool operation unifying system according to claim 3, wherein said computer comprising a component of said unifying system, and further comprises means for waiting for receiving all of the output information respondent to said commands from said system management software tools, and means for modifying said received output information and displaying a result of said modification in respective windows of said multiwindow terminal apparatus, for displaying output information respondent to said commands in said unified fashion.

5. The tool operation unifying system according to claim 3, wherein said computer comprises a component of said unifying system, and further comprises means for displaying operation objects to be indicated by an operator in said multiwindow terminal apparatus, and means for converting each of said operation objects on said multiwindow terminal apparatus into a plurality of respective commands for said plurality of system management software tools, for activating an operation for different system management software tools in response to an indication of a corresponding operation object.

6. The tool operation unifying system according to claim 5, wherein said unifying system further comprises means for drawing a diagram of said computer system which is a target of said unifying system, and means for displaying said diagram in said multiwindow terminal apparatus, and means for arranging said operation objects on said diagram displayed in said multiwindow terminal apparatus, for activating said operation in response to an indication of said corresponding operation object displayed on said diagram of said target computer system.

7. A method of unifying operation fashions of different management software tools dedicated to different computer systems a tool operation unifying system comprising a main computer having a multiwindow terminal apparatus, an emulator for emulating a management software tool of each of said computer systems, and a display for displaying an output of said emulator in a window of said multiwindow terminal apparatus, wherein said plurality of computer systems are connected to said unifying system through said emulator, and each of said computer systems comprises a terminal unit wherein an operating system of a corresponding management software tool differs from an other one of said different management software tools, said method comprising the steps of:

modifying, by said unifying system, output information from said different management software tools into a converted format so as to make respective output information from said software tools unified to appear to have a common format to an operator, and displaying, by said unifying system, the modified output information on said display in respective windows of said multiwindow terminal apparatus in said common format.

* * * * *